Jan. 5, 1937.  E. W. SEEGER ET AL  2,066,745
CIRCUIT CONTROLLER
Filed Sept. 6, 1935   3 Sheets-Sheet 1

Inventors
Edwin W. Seeger
Paisley B. Harwood
By Franklin Hubbard
Attorney

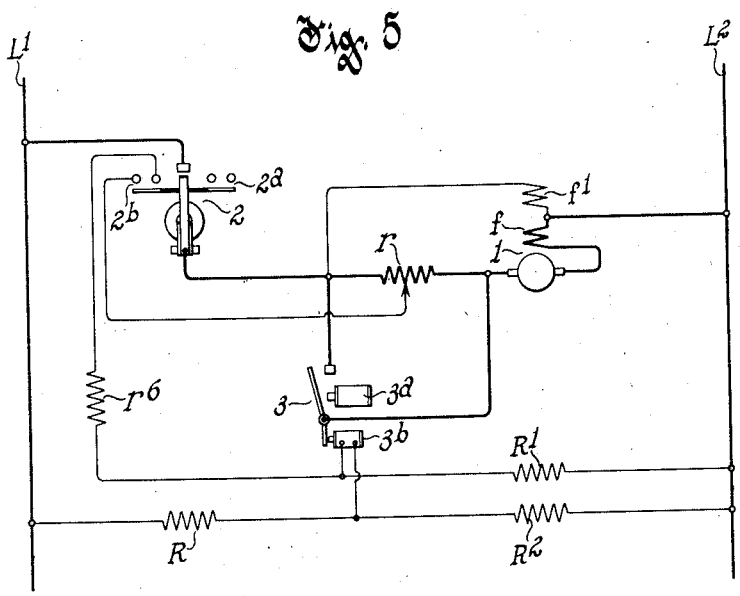

Patented Jan. 5, 1937

2,066,745

UNITED STATES PATENT OFFICE 2,066,745

CIRCUIT CONTROLLER

Edwin W. Seeger and Paisley B. Harwood, Wauwatosa, Wis., assignors to Cutler-Hammer, Inc., Milwaukee, Wis., a corporation of Delaware Application September 6, 1935, Serial No. 39,381

13 Claims. (Cl. 172—288)

This invention relates to improvements in circuit controllers, and more particularly to controllers of the so-called inductive time limit type now commonly employed for electric motors and other devices.

In motor controllers of such type the accelerating switches have coils providing magnetic flux to delay accelerating operations of such switches and due to residual magnetism some difficulty has been experienced in utilizing the decaying flux to its full extent for timing purposes. It has been recognized that such difficulty may be largely or entirely overcome by forcing the decaying flux to pass through zero but how best to accomplish this has been a problem.

The present invention has among its objects to provide exceedingly simple and effective means applicable to such controllers for electric motors and other devices to so dispose of the residual magnetism difficulties and to enable procurement of a relatively long time element free from the uncertainties heretofore encountered.

Another object is to provide means for the aforesaid purpose which may be readily applied either to controllers wherein the switches to be controlled are of the two coil type or to controllers wherein such switches are of the single coil type.

Another object is to provide means for the aforesaid purpose which may be readily applied either to a controller having a single switch to be delayed or to a controller having a multiplicity of such switches to be operated progressively.

Other objects and advantages of the invention will hereinafter appear.

According to the present invention it is proposed to provide the coil which affords the time element whether it be the main operating coil or a separate holdout coil with simple and effective connections by which said coil is first energized and then subjected to a restricted reverse flow of current to cause the decaying magnetic flux of said coil to pass through zero.

The accompanying drawings illustrate certain embodiments of the invention and the same will now be described, it being understood that the controllers illustrated are susceptible of various modifications without departing from the scope of the appended claims.

In the accompanying drawings Fig. 1 shows diagrammatically a motor controller having a single step of acceleration accomplished through the medium of a switch having an operating coil and a separate holdout coil;

Fig. 5 shows a modified reverse current circuit.

Figure 1:
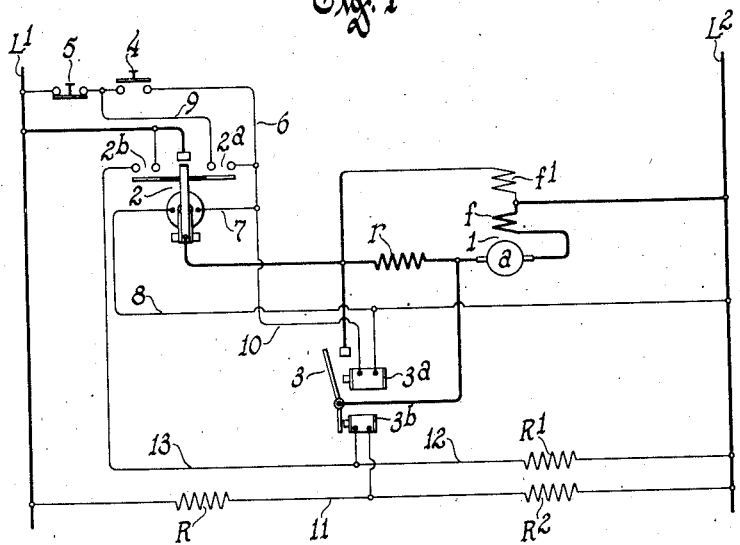

Referring to Fig. 1, the same shows a controller for a compound wound motor $I$ having an armature $a$, a series field winding $f$ and a shunt field winding $f^1$, said motor to be accelerated through a single step of resistance $r$. The motor is adapted to be connected across lines $L^1$ and $L^2$ through resistance $r$ by a single pole electromagnetic main switch 2, while an accelerating switch 3 is provided to short-circuit the resistance $r$. The switch 3 is of a well known form having a shunt operating coil $3^a$ and a holdout coil $3^b$, said coils exerting pulls on the same lever on opposite sides of the pivot of said lever.

In this form of controller it is desired to have the main switch 2 close while the switch 3 is open and then to have the switch 3 close subject to a time element, and to effect starting there is provided a starting push button switch 4 which when closed completes an energizing circuit for the main switch through a stop push button switch 5. This energizing circuit may be traced from line $L^1$ through push button switches 5 and 4 in series, by conductors 6 and 7 through the winding of switch 2 by conductor 8 to line $L^2$, and switch 2 in responding completes a maintaining circuit for itself from line $L^1$ through stop push button switch 5 by conductor 9 through contacts $2^a$ of switch 2 to conductor 6 and thence through the winding of switch 2 as already traced. Also upon closure of the starting push button switch 4 a circuit is completed therefrom by conductors 6 and 10 to and through the coil $3^a$ of accelerating switch 3 to conductor 8 which leads to line $L^2$, said switch 4 being shunted by contacts $2^a$ of the main switch when the latter responds. Thus upon closure of the main switch 2 accelerating switch 3 tends to respond to short-circuit resistance $r$ but it is prevented from then responding due to energization of coil $3^b$.

Considering the connections of coil $3^b$, the same is permanently connected across lines $L^1$—$L^2$ whereby it is energized at the time the operating coil $3^a$ is connected in circuit. This permanent sistance R by conductor 11 to and through coil 3$^b$ from right to left, by conductor 12 through a resistance R$^1$ to line L$^2$. The right hand terminal of coil 3$^b$ also has a permanent connection with line L$^2$ through a resistance R$^2$, whereas the left hand terminal of coil 3$^b$ is connected by conductor 13 through auxiliary contacts 2$^b$ of main switch 2 to line L$^1$ so that when main switch 2 closes it establishes a reverse current circuit for coil 3$^b$ which circuit includes only resistance R$^2$. Thus with the resistance R, R$^1$ and R$^2$ properly proportioned the magnetic flux produced by coil 3$^b$ will be caused to begin to decay upon closure of the main switch and will ultimately be forced to pass through zero as a function of the reversal of flow of current through coil 3$^b$ and when the magnetic flux attains or approaches zero value the switch 3 will respond to the pull of coil 3$^a$ to short-circuit the resistance $r$ and thus accelerate the motor. Preferably the resistance R$^2$ is of high ohmic value, while the resistance R is of low ohmic value, the resistance R$^1$ being of medium low ohmic value.

Figure 2:
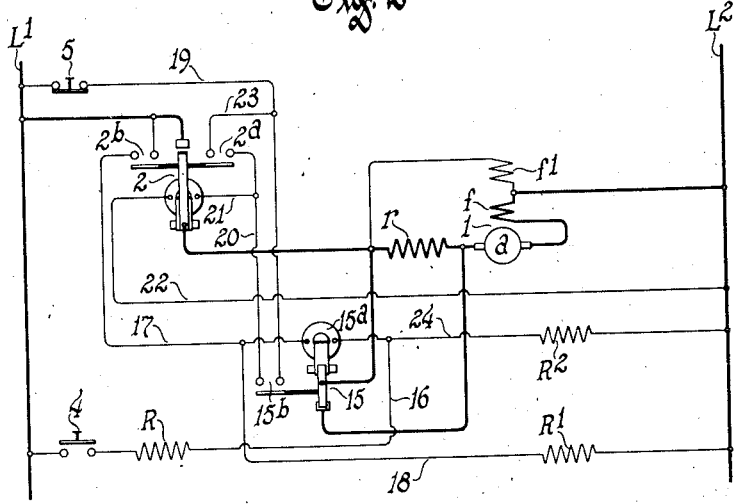
Fig. 2 shows diagrammatically a motor controller having a single accelerating step, the accelerating switch in this instance being of the single coil type.

Referring to Fig. 2, the motor, the main switch, the starting push button switch and the stopping push button switch are identical with the corresponding elements of Fig. 1 and accordingly they have been given the same reference characters. Also this controller employs for control of the timing coil three resistances corresponding to the resistances R, R$^1$ and R$^2$ of Fig. 1 and accordingly these reference numerals are applied also to the resistances of Fig. 2. The accelerating switch 15 of this controller has but a single coil 15$^a$ and said accelerating switch normally stands in closed position subject to opening thereof by its coil. Also in Fig. 2 the control circuits differ somewhat from those shown in Fig. 1, although the motor connections are identical with those shown in Fig. 1.

With the type of control shown in Fig. 2 it is desired to have the normally closed accelerating switch first open and then to have the main switch close to complete the motor circuit and to effect reclosure of the accelerating switch subject to a time delay to short-circuit resistance $r$. To this end the coil of the accelerating switch 15 is normally disconnected from circuit and is made energizable by depression of the starting push button switch 4 which when closed completes circuit from line L$^1$ to and through resistance R by conductors 16 through the coil 15$^a$ of switch 15 from right to left, by conductors 17 and 18 through resistance R$^1$ to line L$^2$. When this circuit is closed switch 15 is moved to open position and through its auxiliary contacts 15$^b$ completes the energizing circuit of main switch 2. The energizing circuit of main switch 2 may be traced from line L$^1$ through stop push button switch 5 by conductor 19 through the now engaged auxiliary contacts 15$^b$ of switch 15 by conductors 20 and 21 through the winding of main switch 2 by conductor 22 to line L$^2$. Main switch 2 in closing to complete the motor circuit establishes for itself a maintaining circuit independent of the auxiliary contacts of accelerating switch 15, said maintaining circuit extending through stop push button switch 5 by conductors 19 and 23 through auxiliary contacts 2$^a$ of said main switch to and through the winding of said main switch to line L$^2$. Thus provision is made for starting the motor and maintaining the motor circuit when switch 15 releases to short-circuit resistance $r$ and to interrupt the energizing circuit of the main switch.

The release of accelerating switch 15 is effected in the following manner. When main switch 2 closes its auxiliary contacts 2$^b$ complete a circuit from line L$^1$ to conductor 17 leading to the left hand terminal of the coil of switch 15, said circuit continuing from the right hand terminal of said coil by conductor 24 through resistance R$^2$ to line L$^2$. Thus closure of the main switch subjects the coil of accelerating switch 15 to a reverse current flow, with the result that the flux produced by said coil is caused to decay and is forced to pass through zero, hence releasing said accelerating switch to short-circuit resistance $r$ subject to a time element.

Figure 3:
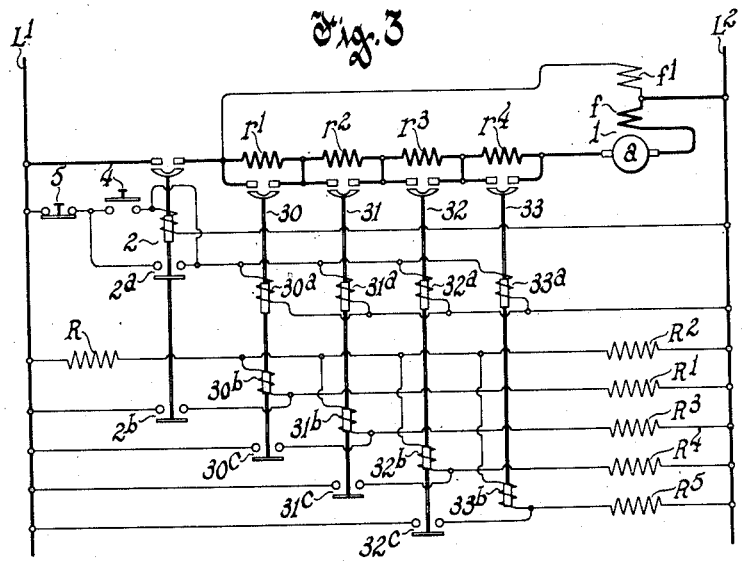
Fig. 3 shows diagrammatically a motor controller affording a multiplicity of accelerating steps and utilizing a plurality of accelerating switches of the type shown in Fig. 1.

Referring to Fig. 3, the motor, the main switch, the starting push button switch and the stop push button switch are identical with the corresponding elements of the previously described controllers, and accordingly they have been given the same reference characters. The motor connections are the same as those shown in Fig. 1 except that in lieu of a single step of resistance $r$ the motor circuit of Fig. 3 has a plurality of steps of resistance $r^1$, $r^2$, $r^3$ and $r^4$ to be short-circuited by accelerating switches 30, 31, 32 and 33, respectively. These accelerating switches are of the two coil type, preferably of the form shown in Fig. 1, but for simplicity of illustration of the control circuits the contacts and coils of each switch including the main switch have been shown in vertical alinement. This controller also utilizes the resistances R, R$^1$ and R$^2$ of Fig. 1 and has in addition resistances R$^3$, R$^4$ and R$^5$ similar to resistance R$^1$ which serve in connection with the holdout coils of accelerating switches 31, 32 and 33, respectively, as does the resistance R$^1$ in connection with accelerating switch 30. Resistances R and R$^2$ are common to the circuits of the several holdout coils.

In the form of controller shown in Fig. 3 it is desired first to close the main switch and then to close the accelerating switches 30, 31, 32 and 33 progressively in the order named, and to this end the main switch is made controllable by the starting push button switch while each accelerating switch has its holdout coil placed under the control of a preceding switch. More particularly, as in the controller of Fig. 1, closure of the push button switch 4 connects the operating winding of the main switch 2 across lines L$^1$ and L$^2$, causing said switch to respond to complete the motor circuit and to complete through its auxiliary contacts 2$^a$ a maintaining circuit for itself as well as line connections for the operating coils 30$^a$, 31$^a$, 32$^a$ and 33$^a$ of the accelerating switches 30, 31, 32 and 33, respectively. As will be noted, these coils are connected in parallel and hence upon closure of the main switch 2 all accelerating switches will tend to respond, but will be delayed in responding by their holdout coils. As will be apparent from the diagram, the holdout coils 30$^b$, 31$^b$, 32$^b$ and 33$^b$ are permanently connected in parallel across lines L$^1$ and L$^2$, the connection of each coil to line L$^1$ extending through resistance R. The connections between coils 30$^b$, 31$^b$, 32$^b$ and 33$^b$ to line L$^2$ extend through resistances R$^1$, R$^3$, R$^4$ and R$^5$, respectively. Thus the holdout coils will be energized at the time the main switch operates to complete the motor circuit. However, when main switch 2 closes its auxiliary contacts 2$^b$ complete a reverse current circuit for holdout coil 30$^b$, said circuit extending from line L$^1$ through contacts 2$^b$ to and through coil 30$^b$ and resistance R$^2$ to line L$^2$, thus rendering accelerating switch 30 operative subject to a time element. Then when switch 30 responds its auxiliary contacts 30$^c$ complete a reverse current circuit for the holdout coil 31$^b$, said circuit extending from line L$^1$ through contacts 30$^c$ to and through coil 31$^b$ and resistance R$^2$ to line L$^2$. Thus after a time interval switch 31 responds and its auxiliary contacts 31$^c$ complete a reverse current circuit for the holdout coil 32$^b$. Similarly when switch 32 responds its auxiliary contacts 32$^c$ complete a reverse current circuit for the holdout coil 33$^b$, the reverse current circuits of both of the coils 32$^b$ and 33$^b$ like those of the coils 30$^b$ and 31$^b$ extending to line L$^2$ through resistance R$^2$.

Figure 4:
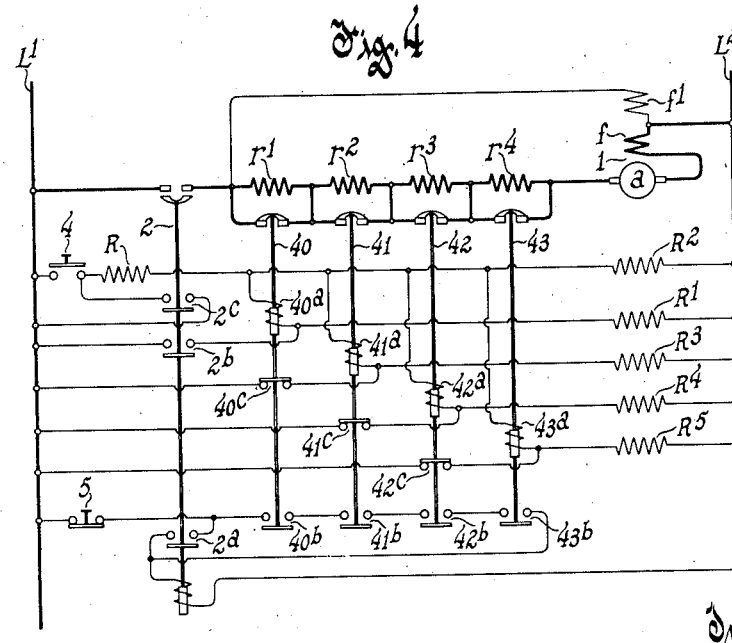
Fig. 4 shows diagrammatically a motor controller affording a multiplicity of steps of acceleration and utilizing the single coil type of accelerating switch shown in Fig. 2.

Referring to Fig. 4, the motor, the main switch except for the addition of a contact, the starting push button switch and the stopping push button switch are identical with the corresponding elements of the previously described controllers, and accordingly they have been given the same reference characters. Also the motor circuit is identical with that shown in Fig. 3, this motor circuit including resistances $r^1$, $r^2$, $r^3$ and $r^4$ and this controller employs in connection with the several accelerating switches the resistances R to R$^5$ of Fig. 3. The accelerating switches 40, 41, 42 and 43 are of the single coil type, preferably of the form shown in Fig. 2, all switches in this case as in Fig. 3 being illustrated with their contacts and coils in vertical alinement.

In the form of the controller shown in Fig. 4 the accelerating switches are normally closed, and it is desired first to energize all of said switches to open the same, then to effect response of the main switch to complete the motor circuit and thereafter to effect release of the accelerating switches 40, 41, 42 and 43 progressively in the order named for short-circuiting resistance $r^1$, $r^2$, $r^3$ and $r^4$, respectively. As in Fig. 2 starting is effected by closing push button switch 4, which in this instance completes a connection from line L$^1$ through resistance R to the accelerating switch coils 40$^a$, 41$^a$, 42$^a$ and 43$^a$ in parallel, said coils being connected to line L$^2$ through resistances R$^1$, R$^3$, R$^4$ and R$^5$, respectively. Thus closure of push button switch 4 effects response of all accelerating switches for opening thereof, and such response of the accelerating switches effects engagement of their auxiliary contacts 40$^b$, 41$^b$, 42$^b$ and 43$^b$ to establish an energizing circuit for the main switch 2. This circuit extends from line L$^1$ through stop push button switch 5 to and through the contacts 40$^b$, 41$^b$, 42$^b$ and 43$^b$ inseries to and through the winding of main switch 2 to line L$^2$. Main switch 2 thereupon responds to complete the motor circuit and to complete for itself through its auxiliary contacts 2$^a$ a maintaining circuit as explained in connection with Fig. 2. Also the main switch in responding completes through its auxiliary contacts 2$^c$ a circuit shunting the push button switch 4 which feeds the coils of the accelerating switches. Furthermore main switch 2 in responding engages its auxiliary contacts 2$^b$ to complete a reverse current circuit for coil 40$^a$ of accelerating switch 40. This reverse current circuit extends from line L$^1$ through contacts 2$^b$ and coil 40$^a$ to and through resistance R$^2$ to line L$^2$ and establishment of this circuit causes switch 40 to be released for return to closed position subject to a time element. When switch 40 returns to closed position it effects engagement of its auxiliary contacts 40$^c$ to complete a reverse current circuit for the coil 41$^a$ of accelerating switch 41, said circuit extending from line L$^1$ through contacts 40$^c$ to and through coil 41$^a$ and resistance R$^2$ to line L$^2$. Switch 41 in returning to closed position engages its auxiliary contacts 41$^c$ to complete a reverse current circuit for coil 42$^a$ of switch 42, and switch 42 in returning to closed position engages its auxiliary contacts 42$^c$ to establish a reverse current circuit for coil 43$^a$ of switch 43. The reverse current circuits of the coils 42$^a$ and 43$^a$ extend to line L$^2$ through resistance R$^2$, as in the case of the reverse current circuits of the coils 40$^a$ and 41$^a$.

Referring to Fig. 5, the same shows the controller of Fig. 1 in part with its reverse current circuit modified in one of numerous possible ways. In this instance all connections of the holding out coil 3$^b$ are the same as in Fig. 1 except the connection through the auxiliary contacts 2$^b$ of main switch 2. Whereas in Fig. 1 this connection extended from the coil to line L$^1$ the coil is here connected through a resistance $r^6$ and contacts 2$^b$ to the resistance $r$ in the motor circuit at a point between the terminals of resistance $r$, such point to be shifted as desired. This connection affords some influence by the motor current on the reverse current flow to coil 3$^b$ which in some instances may be found desirable and affords adjustment of the reverse current flow by shifting the point of connection with resistance $r$.

What we claim as new and desire to secure by Letters Patent is:

1. In an electric controller in combination, a switch having control means comprising an electroresponsive coil providing a magnetic flux to delay a given operation of said switch and circuit controlling means for said coil comprising an energizing circuit having resistances between which said coil is included and further comprising a circuit having a switch and a resistance between which said coil is included for subjecting said coil to a reverse current flow to cause said flux to decay and pass through zero.

2. In an electric controller in combination, a switch having control means comprising an electroresponsive coil providing a magnetic flux to delay a given operation of said switch and circuit controlling means for said coil comprising an energizing circuit having resistances between which said coil is included and further comprising a circuit having a switch and a resistance between which said coil is included for subjecting said coil to a reverse current flow to cause said flux to decay and pass through zero, the last mentioned resistance having a high ohmic value.

3. In an electric controller in combination, a switch having control means comprising an electroresponsive coil providing a magnetic flux to delay a given operation of said switch, a circuit for said coil having resistance betwen said coil and each side of the supply, a reverse connection between one terminal of said coil and the supply, such reverse connection including a resistance of high ohmic value and a reverse connection between the other terminal of said coil and the supply, the latter reverse connection including a switch.

4. In a motor controller in combination, an accelerating switch having control means comprising an electroresponsive coil providing a magnetic flux to delay accelerating operation of said switch and circuit controlling means for said coil to energize the same and subject it to a reverse current flow progressively, the latter means providing for energization of said coil prior to completion of the motor circuit and for automatically subjecting said coil to reverse current flow after completion of the motor circuit.

5. In a motor controller in combination, an accelerating switch having control means comprising an electroresponsive coil providing a magnetic flux to delay accelerating operation of said switch and circuit controlling means for said coil to energize the same and subject it to a reverse current flow progressively, the latter means providing for energization of said coil prior to completion of the motor circuit and for automatically subjecting said coil after completion of the motor circuit to a reverse current flow which is subject to an influence of the motor current.

6. In a motor controller in combination, starting and accelerating means including a main switch and at least one accelerating switch having a coil providing a magnetic flux to delay accelerating operation of said accelerating switch, a circuit providing for energization of said coil at the time said main switch is closed and a circuit completed by closure of said main switch to subject said coil to a reverse current flow to cause said flux in decaying to pass through zero.

7. In a motor controller in combination, starting and accelerating means including a main switch and at least one accelerating switch having a coil providing a magnetic flux to delay accelerating operation of said accelerating switch, a circuit providing for energization of said coil at the time said main switch is closed and a circuit completed by closure of said main switch to subject said coil to a reverse current flow to cause said flux in decaying to pass through zero, said energizing circuit including resistance between said coil and each side of the supply and said reverse current flow circuit including a resistance of high ohmic value between said coil and one side of the supply.

8. In a circuit controller in combination, a plurality of switches, each of a plurality of said switches having control means including an individual electroresponsive coil providing a magnetic flux to delay a given operation of its respective switch, energizing circuits for said coils and reverse current flow connections for said coils including control switches providing for completion of such connections of said coils progressively.

9. In a circuit controller in combination, a plurality of switches, each of a plurality of said switches having control means including an individual electroresponsive coil providing a magnetic flux to delay a given operation of its respective switch, energizing circuits for said coils comprising a common connection between said coils and one side of the supply, such connection including resistance and individual connections between said coils and the other side of the supply, such individual connections each including resistance and reverse current flow circuits for said coils comprising a common connection between said coils and one side of the supply, such connection including resistance of a high ohmic value, and individual connections between said coils and the other side of the supply, such individual connections each including a control switch.

10. In a motor controller in combination, starting and accelerating means comprising a main switch and a plurality of accelerating switches, each of the latter having a coil providing a magnetic flux to delay accelerating operation of its respective accelerating switch, energizing circuits for said coils providing for their energization at the time of closure of said main switch and reverse current flow circuits for said coils including control switches providing for completion of such circuits of said coils progressively following closure of said main switch.

11. In a motor controller in combination, starting and accelerating means comprising a main switch and a plurality of accelerating switches, each of the latter having a coil providing a magnetic flux to delay accelerating operation of its respective accelerating switch, energizing circuits for said coils providing for their energization at the time of closure of said main switch and reverse current flow circuits for said coils including control switches providing for completion of such circuits of said coils progressively following closure of said main switch, one of the last mentioned switches being operatively connected to said main switch, and each of the other of said last mentioned switches being operatively associated with one of said accelerating switches other than its respective accelerating switch.

12. In a motor controller in combination, starting and accelerating means comprising a main switch and a plurality of accelerating switches, each of the latter having a coil providing a magnetic flux to delay accelerating operation of its respective accelerating switch, energizing circuits for said coils providing for their energization at the time of closure of said main switch and reverse current flow circuits for said coils including control switches providing for completion of such circuits of said coils progressively following closure of said main switch, each of said energizing circuits including two resistors and having its respective coil located therebetween and the several energizing circuits having in common a connection including one of said resistors, and the several reverse current flow circuits having a common resistor of high ohmic value.

13. In an electric controller, in combination, an electroresponsive switch having a coil which when energized delays a given movement of said switch and control means for said switch providing for energization of said coil preparatory to effecting such given movement of said switch and comprising current reversing connections for said coil and also means which when said control means directs such given movement of said switch commutates said reversing connections of said coil to cause its magnetic flux to decay and to pass through zero.

EDWIN W. SEEGER.
PAISLEY B. HARWOOD.